US006778954B1

(12) United States Patent
Kim et al.

(10) Patent No.: US 6,778,954 B1
(45) Date of Patent: Aug. 17, 2004

(54) SPEECH ENHANCEMENT METHOD

(75) Inventors: Moo-young Kim, Seongnam (KR); Sang-ryong Kim, Yongin (KR); Nam-soo Kim, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 09/572,232

(22) Filed: May 17, 2000

(30) Foreign Application Priority Data

Aug. 28, 1999 (KR) .......................................... 99-36115

(51) Int. Cl.$^{7}$ .......................... G10L 21/02; G10L 15/20
(52) U.S. Cl. ....................................... 704/226; 704/233
(58) Field of Search ................................ 704/226, 233, 704/265, 230

(56) References Cited

U.S. PATENT DOCUMENTS

| | | | | | |
|---|---|---|---|---|---|
| 5,012,519 | A | * | 4/1991 | Adlersberg et al. | 704/225 |
| 5,307,441 | A | * | 4/1994 | Tzeng | 704/222 |
| 5,666,429 | A | * | 9/1997 | Urbanski | 381/94.1 |
| 6,263,307 | B1 | * | 7/2001 | Arslan et al. | 704/205 |
| 6,453,291 | B1 | * | 9/2002 | Ashley | 704/200 |
| 6,542,864 | B2 | * | 4/2003 | Cox et al. | 704/212 |
| 6,604,071 | B1 | * | 8/2003 | Cox et al. | 704/225 |
| 2002/0002455 | A1 | * | 1/2002 | Accardi et al. | 704/226 |

OTHER PUBLICATIONS

Ephraim et al, "Speech Enhancement using a minimum--mean square error short time spectral amplitude estimator", IEEE Transactions on Acoustics, Speech, and Signal Processing, vol. 32, pp. 1109–1121.*

Epraim et al, "Speech Enhancement using a minimum–mean square error short time spectral amplitude estimator", IEEE Transactions on Acoustics, Speech, and Signal Processing, vol. 32, pp. 1109–1121.*

* cited by examiner

*Primary Examiner*—Richemond Dorvil
*Assistant Examiner*—A. Armstrong
(74) *Attorney, Agent, or Firm*—Burns, Doane, Swecker & Mathis, L.L.P.

(57) ABSTRACT

A speech enhancement method, including the steps of: (a) segmenting an input speech signal into a plurality of frames and transforming each frame signal into a signal of the frequency domain; (b) computing the signal-to-noise ratio of a current frame, and computing signal-to-noise ratio of a frame immediately preceding the current frame; (c) computing the predicted signal-to-noise ratio of the current frame which is predicted based on the preceding frame and computing the speech absence probability using the signal-to-noise ratio and predicted signal-to-noise ratio of the current frame; (d) correcting the two signal-to-noise ratios obtained in the step (b) based on the speech absence probability computed in the step (c); (e) computing the gain of the current frame with the two corrected signal-to-noise ratios obtained in the step (d), and multiplying the speech spectrum of the current frame by the computed gain; (f) estimating the noise and speech power for the next frame to calculate the predicted signal-to-noise ratio for the next frame, and providing the predicted signal-to-noise ratio for the next frame as the predicted signal-to-noise ratio of the current frame for the step (c); and (g) transforming the result spectrum of the step (e) into a signal of the time domain. The noise spectrum is estimated in speech presence intervals based on the speech absence probability, as well as in speech absence intervals, and the predicted SNR and gain are updated on a per-channel basis of each frame according to the noise spectrum estimate, which in turn improves the speech spectrum in various noise environments.

10 Claims, 2 Drawing Sheets

SPEECH ENHANCEMENT METHOD

BACKGROUND OF THE INVENTION

1 Field of the Invention

The present invention relates to speech enhancement, and more particularly, to a method for enhancing a speech spectrum by estimating a noise spectrum in speech presence intervals based on speech absence probability, as well as in speech absence intervals.

2. Description of the Related Art

A conventional approach to speech enhancement is to estimate a noise spectrum in noise intervals where speech signals are not present, and in turn to improve a speech spectrum in a predetermined speech interval based on the noise spectrum estimate. A voice activity detector (VAD) has been utilized for an algorithm required for speech presence/absence interval classification with respect to a predetermined input signal. However, the VAD operates in a different manner from a speech enhancement technique, and thus noise interval detection and noise spectrum estimation based on detected noise intervals have no relationship with models and assumptions for use in practical speech enhancement, which degrades the performance of the speech enhancement technique. In addition, in the case of using the VAD, the noise spectrum is estimated only in speech absence intervals. However, since the noise spectrum actually varies in speech presence intervals as well as the speech absence intervals, the accuracy of noise spectrum estimation using the VAD is limited.

SUMMARY OF THE INVENTION

To solve the above problems, it is an object of the present invention to provide a method for enhancing a speech spectrum in which a signal-to-noise ratio (SNR) and a gain of each frame of an input speech signal is updated based on a speech absence probability, without using a separate voice activity detector (VAD).

The above object is achieved by the method according to the present invention for enhancing the speech quality, comprising: (a) segmenting an input speech signal into a plurality of frames and transforming each frame signal into a signal of the frequency domain; (b) computing the signal-to-noise ratio of a current frame, and computing signal-to-noise ratio of a frame immediately preceding the current frame; (c) computing the predicted signal-to-noise ratio of the current frame which is predicted based on the preceding frame and computing the speech absence probability using the signal-to-noise ratio and predicted signal-to-noise ratio of the current frame, (d) correcting the two signal-to-noise ratios obtained in the step (b) based on the speech absence probability computed in the step (c); (e) computing the gain of the current frame with the two corrected signal-to-noise ratios obtained in the step (d), and multiplying the speech spectrum of the current frame by the computed gain; (f) estimating the noise and speech power for the next frame to calculate the predicted signal-to-noise ratio for the next frame, and providing the predicted signal-to-noise ratio for the next frame as the predicted signal-to-noise ratio of the current frame for the step (c); and (g) transforming the result spectrum of the step (e) into a signal of the time domain.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
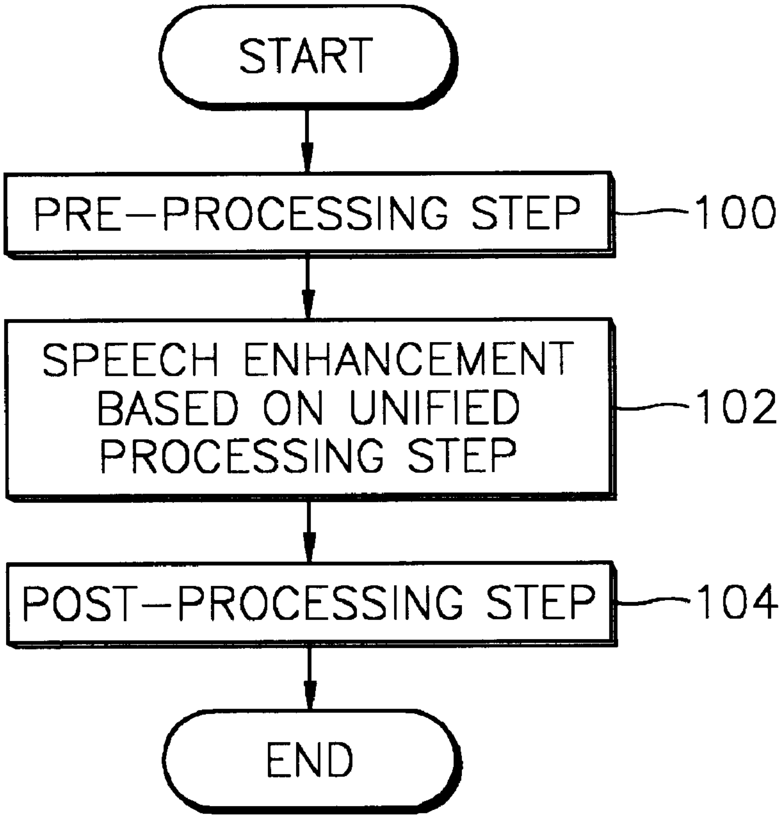
FIG. 1 is a flowchart illustrating a speech enhancement method according to a preferred embodiment of the present invention.

Referring to FIG. 1, speech enhancement based on unified processing (SEUP) according to the present invention involves a pre-processing step 100, an SEUP step 102 and a post-processing step 104. In the pre-processing step 100, an input speech-plus-noise signal is pre-emphasized and subjected to an M-point Fast Fourier Transform (FFT). Assuming that an input speech signal is s(n) and the signal of an n-th frame, which is one of the frames obtained by segmentation of the signal s(n), is d(m,n), the signal d(m,n) and signal d(m,D +n) which is pre-emphasized and overlaps with a rear portion of the preceding frame by pre-emphasis, are given by the equation (1)

$$d(m,n)=d(m-1,L+n),\ 0\leqq n\leqq D$$

$$d(m,D+n)=s(n)+\zeta\cdot s(n-1),\ 0\leqq n\leqq L \quad (1)$$

where D is the overlap length with the preceding frame, L is the length of one frame and ζ is the pre-emphasis parameter. Then, prior to the M-point FFT, the pre-emphasized input speech signal is subjected to trapezoidal windowing given by the equation (2)

$$y(n)=\begin{cases} d(m,n)\sin^2(\pi(n+0.5)/2D), & 0\le n<D \\ d(m,n), & D<n<L \\ d(m,n)\sin^2(\pi(n-L+D+0.5)/2D), & L\le n<D+L \\ 0, & D+L\le n<M \end{cases} \quad (2)$$

The obtained signal y(n) is converted into a signal of the frequency domain by FFT given by the equation (3)

$$Y_m(k)=\frac{2}{M}\sum_{n=0}^{M-1} y(n)e^{-j2\pi nk/M},\ 0\le k<M \quad (3)$$

As can be noticed from the equation (3), the frequency domain signal $Y_m(k)$ obtained by the FFT is a complex number which consists of a real part and a imaginary part.

In the SEUP step 102, the speech absence probabilities, the signal-to-noise ratios, and the gains of frames are computed, and the result of the pre-processing step 100, i.e., $Y_m(k)$ of the equation (3), is multiplied by the obtained gain to enhance the spectrum of the speech signal, which results in the enhanced speech signal $\tilde{Y}_m(k)$. During the SEUP step 102, the gains and SNRs for a predetermined number of initial frames are initialized to collect background noise information. This SEUP step 102 will be described later in greater detail with reference to FIG. 2.

In the post-processing step 104, the spectrum enhanced signal $\tilde{Y}_m(k)$ is converted back into a signal of the time domain by an Inverse Fast Fourier Transform (IFFT) given by the equation (4), then de-emphasized.

$$h(m,n)=\frac{1}{2}\sum_{n=0}^{M-1}\tilde{Y}_m(k)e^{j2\pi nk/M} \quad (4)$$

Prior to the de-emphasis, the signal h(m,n) obtained through the IFFT is subjected to an overlap-and-add operation using the equation (5)

$$h'(n)=\begin{cases} h(m,n)+h(m-1,n+L), & 0\le n<D \\ h(m,n), & D\le n<L \end{cases} \quad (5)$$

Then, the de-emphasis is performed to output the speech signal s' (n) using the equation (6)

$$s'(n)=h'(n)-\zeta\cdot s'(n-1),\ 0\leqq n<L \quad (6)$$

Figure 2:
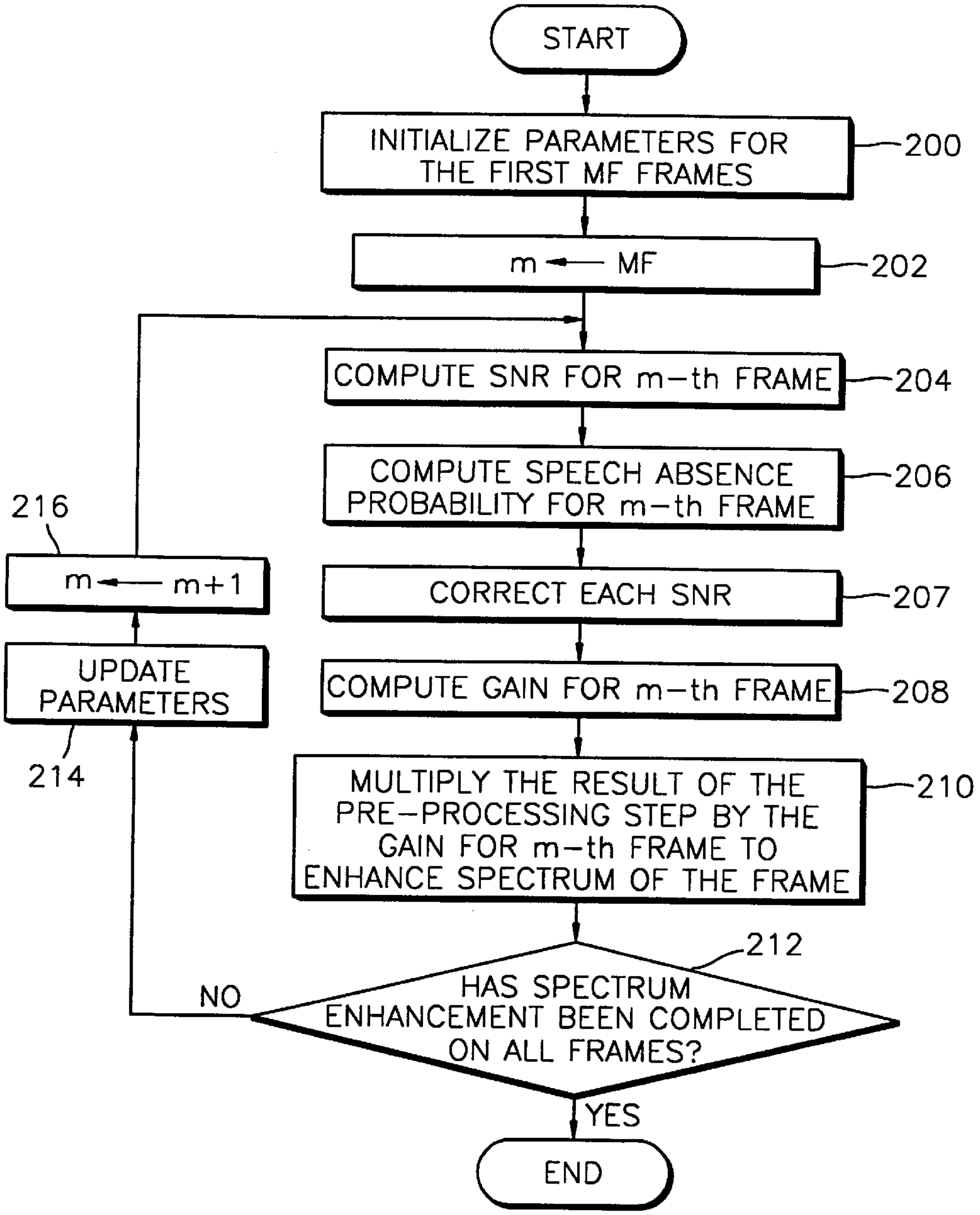
FIG. 2 is a flowchart illustrating the SEUP step in FIG. 1.

FIG. 2 is a flowchart illustrating in greater detail the SEUP step 102 in FIG. 1. As shown in FIG. 2, the SEUP step includes initializing parameters for a predetermined number of initial frames (step 200), incrementing the frame index and computing the SNR of the current frame (steps 202 and 204), computing the speech absence probability of the current frame (step 206), correcting SNRs of the preceding and current frames (step 207), computing the gain of the current frame (step 208), enhancing the speech spectrum of the current frame (step 210), and repeating the steps 212 through 216 for all the frames.

As previously mentioned, the speech signal applied to the SEUP step 202 is a speech-plus-noise signal which has undergone pre-emphasis and the FFT. Assuming that the original speech spectrum is $X_m(k)$ and the original noise spectrum is $D_m(k)$, the spectrum of the k-th frequency of the m-th frame of the speech signal, $Y_m(k)$, is modeled by the equation (7)

$$Y_m(k)=X_m(k)+D_m(k) \quad (7)$$

In the equation (7), $X_m(k)$ and $D_m(k)$ are statistically independent, and each has the zero-mean complex Gaussian probability distribution given by the equation (8)

$$p(X_m(k))=\frac{1}{\pi\lambda_{x,m}(k)}\exp\left[-\frac{|X_m(k)|^2}{\lambda_{x,m}(k)}\right] \quad (8)$$

$$p(D_m(k))=\frac{1}{\pi\lambda_{d,m}(k)}\exp\left[-\frac{|D_m(k)|^2}{\lambda_{d,m}(k)}\right]$$

where $\lambda_{x,m}(k)$ and $\lambda_{d,m}(k)$ are the variances of the speech and noise spectrum, respectively, which substantially means the power of speech and noise at the k-th frequency. However, the actual computations are performed on a per-channel basis, and thus the signal spectrum for the i-th channel of the m-th frame, $G_m(i)$, is given by the equation (9)

$$G_m(i)=S_m(i)+N_m(i) \quad (9)$$

where $S_m(i)$ and $N_m(i)$ are the means of the speech and noise spectrum, respectively, for the i-th channel of the m-th frame. The signal spectrum for the i-th channel of the m-th frame, $G_m(i)$, has probability distributions given by the equation (10) according to the presence or absence of the speech signal.

$$p(G_m(i)\mid H_0)=\frac{1}{\pi\lambda_{n,m}(i)}\exp\left[-\frac{|G_m(i)|^2}{\lambda_{n,m}(i)}\right] \quad (10)$$

$$p(G_m(i)\mid H_1)=\frac{1}{\pi(\lambda_{n,m}(i)+\lambda_{s,m}(i))}\exp\left[-\frac{|G_m(i)|^2}{\lambda_{n,m}(i)+\lambda_{s,m}(i)}\right]$$

where $\lambda_{s,m}(i)$ and $\lambda_{n,m}(i)$ are the power of the speech and noise signals, respectively, for the i-th channel of the m-th frame.

In the step 200, parameters are initialized for a predetermined number of initial frames to collect background noise information. The parameters, such as the noise power estimate $\hat{\lambda}_{n,m}(i)$ the gain H(m,i) multiplied to the spectrum of the i-th channel of the m-th frame, and the predicted SNR $\xi_{pred}(m,i)$, for the i-th channel of the m-th frame, are initialized for the first MF frames using the equation (11)

$$\hat{\lambda}_{n,m}(i)=\begin{cases} |G_m(i)|^2, & m=0 \\ \varsigma_n\hat{\lambda}_{n,m-1}(i)+(1-\varsigma_n)|G_m(i)|^2, & 0<m<MF \end{cases} \quad (11)$$

$$H(m,i)=GAIN_{\text{MIN}}$$

$$\xi_{pred}(m,i)=\begin{cases} \max[(GAIN_{\text{MIN}})^2, SNR_{\text{MIN}}], & m=0 \\ \max\left[\varsigma_s\xi_{pred}(m-1,i)+(1-\varsigma_s)\frac{|\hat{S}_{m-1}(i)|^2}{\hat{\lambda}_{n,m-1}(i)}, SNR_{\text{MIN}}\right], & 0<m<MF \end{cases}$$

where $\zeta_n$ and $\zeta_s$ are the initialization parameters, and $SNR_{min}$ and $GAIN_{min}$ are the minimum SNR and the minimum gain, respectively, obtained in the SEUP step 102, which can be set by a user.

After the initialization of the first MF frames is complete, the frame index is incremented (step 202), and the signal of the corresponding frame (herein, the m-th frame) is processed. In the step 204, a post (abbreviated for "posteriori") SNR $\xi_{post}(m, i)$ is computed for the m-th frame. For the computation of the post SNR for each channel of the m-th frame, the power of the input signal $E_{acc}(m, i)$ is smoothed by the equation (12) in consideration of the interframe correlation of the speech signal $$E_{acc}(m,i)=\zeta_{acc}E_{axx}(m-1,i)+(1-\zeta_{acc})|G_m(i)|^2,\ 0\leqq i\leqq N_c-1 \quad (12)$$

where $\zeta_{acc}$ is the smoothing parameter and $N_c$ is the number of channels.

Then, the post SNR for each channel is computed with the power of the m-th channel $E_{acc}(m,i)$ obtained using the equation (12), and the noise power estimate $\hat{\lambda}_{n,m}(i)$ obtained using the equation (11), using the equation (13)

$$\xi_{post}(m,i)=\max\left[\frac{E_{acc}(m,i)}{\hat{\lambda}_{n,m}(i)}-1, SNR_{\text{MIN}}\right] \quad (13)$$

In the step 206, the speech absence probability for the m-th frame is computed. The speech absence probability $p(H_0|G_m(i))$ for each channel of the m-th frame is computed using the equation (14)

$$p(H_0 \mid G_m(i)) = \frac{p(G_m(i) \mid H_0)p(H_0)}{p(G_m(i) \mid H_0)p(H_0) + p(G_m(i) \mid H_1)p(H_1)} \quad (14)$$

With the assumption that the channel spectrum $G_m(i)$ for each channel is independent and referring to the equation (10), the equation (14) can be written as $$p(H_0 \mid G_m(i)) = \frac{\prod_{i=0}^{N_c-1} p(G_m(i) \mid H_0)p(H_0)}{\prod_{i=0}^{N_c-1} p(G_m(i) \mid H_0)p(H_0) + \prod_{i=0}^{N_c-1} p(G_m(i) \mid H_1)p(H_1)} = \frac{1}{1 + \frac{p(H_1)}{p(H_0)} \prod_{i=0}^{N_c-1} \Lambda_m(i)(G_m(i))} \quad (15)$$

As can be noticed from the equation (15), the speech absence probability is decided by $\Lambda_m(i)(G_m(i))$, which is the likelihood ratio expressed by the equation (16). As shown in the equation (16), the likelihood ratio $\Lambda_m(i)(G_m(i))$ can be rearranged by the substitution of the equation (10) and expressed by $\eta_m(i)$ and $\xi_m(i)$.

$$\Lambda_m(i)(G_m(i)) = \frac{p(G_m(i) \mid H_1)}{p(G_m(i) \mid H_0)} = \frac{\lambda_{n,m}(i)}{\lambda_{n,m}(i) + \lambda_{s,m}(i)} \exp\left[-\frac{|G_m(i)|^2}{\lambda_{n,m}(i) + \lambda_{n,m}(i)} + \frac{|G_m(i)|^2}{\lambda_{n,m}(i)}\right] = \frac{1}{1 + \xi_m(i)} \exp\left[\frac{(\eta_m(i) + 1)\xi_m(i)}{1 + \xi_m(i)}\right] \quad (16)$$

where $$\eta_m(i) = \frac{|G_m(i)|^2}{\lambda_{n,m}(i)} - 1$$

$$\xi_m(i) = \frac{\lambda_{s,m}(i)}{\lambda_{n,m}(i)}$$

In the equation (16), $\eta_m(i)$ and $\xi_m(i)$ are estimated based on known data, and are set by the equation (17) in the present invention $$\eta_m(i) = \xi_{post}(m,i)$$

$$\xi_m(i) = \xi_{spred}(m,i) \quad (17)$$

where $\xi_{post}(m,i)$ is the post SNR for the m-th frame obtained using the equation (13), and $\xi_{pred}(m,i)$ is the predicted SNR for the m-th frame which is calculated using the preceding frames obtained by the equation (11).

In the step 207, the pri (abbreviation for "priori") SNR $\xi_{pri}(m,i)$ and the post SNR $\xi_{post}(m,i)$ are corrected based on the obtained speech absence probability. The pri SNR $\xi_{pri}(m,i)$ is the SNR estimate for the (m−1)th frame, which is obtained based on the SNR of the current frame in a decision-directed method by the equation (18)

$$\xi_{spri}(m, i) = \alpha \frac{|\hat{S}_{m-1}(i)|^2}{\lambda_{n,m-1}(i)} + (1-\alpha)\xi_{post}(m, i) = \alpha \frac{|H(m-1, i)G_{m-1}(i)|^2}{\hat{\lambda}_{n,m-1}(i)} + (1-\alpha)\xi_{post}(m, i) \quad (18)$$

where $\alpha$ is the SNR correction parameter and $|\hat{S}_{m-1}(i)|^2$ is the speech power estimate of the (m−1)th frame.

$\xi_{pri}(m,i)$ of the equation (18) and $\xi_{post}(m,i)$ of the equation (13) are corrected using the equation (19) according to the speech absence probability calculated using the equation (15)

$$\xi_{pri}(m, i) = \max\{p(H_0 \mid G_m(i))SNR_{MIN} + p(H_1 \mid G_m(i))\xi_{pri}(m, i), SNR_{MIN}\} \quad (19)$$

$$\xi_{post}(m, i) = \max\{p(H_0 \mid G_m(i))SNR_{MIN} + p(H_1 \mid G_m(i))\xi_{post}(m, i), SNR_{MIN}\}$$

where $p(H_1|G_m(i))$ is the speech-plus-noise presence probability.

In the step 208, the gain H(m,i) for the i-th channel of the m-th frame is computed with $\xi_{pri}(m,i)$ and $\xi_{post}(m,i)$ using the equation (20)

$$H(m, i) = \Gamma(1.5)\frac{\sqrt{v_m(i)}}{\gamma_m(i)}\exp\left(-\frac{v_m(i)}{2}\right)\left[(1 + v_m(i))I_0\left(\frac{v_m(i)}{2}\right) + v_m(i)I_1\left(\frac{v_m(i)}{2}\right)\right] \quad (20)$$

where $$\gamma_m(i) = \xi_{post}(m, i) + 1$$

$$v_m(i) = \frac{\xi_{pri}(m, i)}{1 + \xi_{pri}(m, i)}(1 + \xi_{post}(m, i))$$

and $I_0$ and $I_1$ are the 0th order and 1st order coefficients, respectively, of the Bessel function.

In the step 210, the result of the pre-processing step (step 100) is multiplied by the gain H(m,i) to enhance the spectrum of the m-th frame. Assuming that the result of the FFT for the m-th frame of the input signal is $Y_m(k)$, the FFT coefficient for the spectrum enhanced signal, $\tilde{Y}_m(k)$, is given by the equation (21)

$$\tilde{Y}_m(k) = H(m,i)Y_m(k) \quad (21)$$

where $f_L(i) \leqq k < f_H(i)$, $0 \leqq i < N_c - 1$, and $f_L$ and $f_H$ are the minimum and maximum frequencies, respectively, for each channel.

In the step 212, it is determined whether the previously mentioned steps have been performed on all the frames. If the result of the determination is affirmative, the SEUP step terminates. In either case, the previously mentioned steps are repeated until the spectrum enhancement is performed on all the frames.

In particular, unless the spectrum enhancement is performed on all the frames, the parameters, the noise power estimate and the predicted SNR, are updated for the next frame in the step 214. Assuming that the noise power estimate of the current frame is $\hat{\lambda}_{n,m}(i)$, the noise power estimate for the next frame $\hat{\lambda}_{n,m+1}(i)$ is obtained by the equation (22)

$$\hat{\lambda}_{n,m+1}(i) = \zeta_n \hat{\lambda}_{n,m}(i) + (1-\zeta_n)E[|N_m(i)|^2|G_m(i)] \quad (22)$$

where $\zeta_n$ is the updating parameter and $E[|N_m(i)|^2|G_m(i)]$ is the noise power expectation of a given channel spectrum $G_m(i)$ for the i-th channel of the m-th frame, which is obtained by the well-known global soft decision (GSD) method using the equation (23)

$$E[|N_m(i)|^2 \mid G_m(i)] = E[|N_m(i)|^2 \mid G_m(i), H_0]p(H_0 \mid G_m(i)) + E[|N_m(i)|^2 \mid G_m(i), H_1]p(H_1 \mid G_m(i)) \quad (23)$$

-continued where $$E[|N_m(i)|^2 \mid G_m(i), H_0] = |G_m(i)|^2 = E[|N_m(i)|^2 \mid G_m(i), H_1]\left(\frac{\xi_{pred}(m,i)}{1+\xi_{pred}(m,i)}\right)\hat{\lambda}_{n,m}(i) + \left(\frac{1}{1+\xi_{pred}(m,i)}\right)^2 |G_m(i)|^2$$

where $E[|N_m(i)|^2|G_m(i), H_0]$ is the noise power expectation in the absence of speech and $E[|N_m(i)|^2|G_m(i), H_1]$ is the noise power expectation in the presence of speech.

Next, to update the predicted SNR of the current frame, the speech power estimate of the current frame is initially updated and divided by the updated noise power estimate for the next frame, $\hat{\lambda}_{m,m+}(i)$, which is obtained by the equation (22), to give a new SNR for the (m+1)th frame which is expressed as $\xi_{pred}(m+1,i)$ The speech power estimate of the current frame is updated as follows. First, speech power expectation of a given channel spectrum $G_m(i)$ for the i-th channel of the m-th frame, $E[|S_m(i)|^2|G_m(i)]$, is computed by the equation (24)

$$E[|S_m(i)|^2 \mid G_m(i)] = E[|S_m(i)|^2 \mid G_m(i), H_1]p(H_1 \mid G_m(i)) + E[|S_m(i)|^2|G_m(i), H_0]p(H_0|G_m(i)) \quad (24)$$

where $$E[|S_m(i)|^2 \mid G_m(i), H_1] = \left(\frac{1}{1+\xi_{pred}(m,i)}\right)\hat{\lambda}_{s,m}(i) + \left(\frac{\xi_{pred}(m,i)}{1+\xi_{pred}(m,i)}\right)^2 |G_m(i)|^2$$

$$E[|S_m(i)|^2 \mid G_m(i), H_0] = 0$$

where $E[|S_m(i)|^2|G_m(i), H_0]$ is the speech power expectation in the absence of speech and $E[|S_m(i)|^2|G_m(i), H_1]$ is the speech power expectation in the presence of speech.

Then, the speech power estimate for the next frame $\hat{\lambda}_{s,m+1}(i)$ is computed by substituting the speech power expectation $E[|S_m(i)|^2|G_m(i)]$ into the equation (25)

$$\hat{\lambda}_{s,m+1}(i)=\zeta_s\hat{\lambda}_{s,m}(i)+(1-\zeta_s)E[|S_m(i)|^2|G_m(i)] \quad (25)$$

where $\zeta_s$ is the updating parameter.

Then, the expected signal-to-noise ratio for the (m+1)th frame $\xi_{pred}(m+1,i)$ is calculated using $\hat{\lambda}_{n,m+1}(i)$ of the equation (22) and $\hat{\lambda}_{s,m+1}(i)$ of the equation (25), which is given by the equation (26)

$$\xi_{pred}(m+1,i) = \frac{\hat{\lambda}_{s,m+1}(i)}{\hat{\lambda}_{n,m+1}(i)} \quad (26)$$

After the parameters are updated for the next frame, the frame index is incremented in the step 216 to perform the SEUP for all the frames.

An experiment has been carried out to verify the effect of the SEUP algorithm according to the present invention. In the experiment, a sampling frequency of a speech signal was 8 kHz and a frame interval was 10 msec. The pre-emphasis parameter $\zeta$, which is shown in the equation (1), was −0.8. The size of the FFT, M, was 128. After the FFT, each computation was performed with frequency points divided into $N_c$ channels, wherein $N_c$ was 16. The smoothing parameter, $\zeta_{acc}$, which is shown in the equation (12), was 0.46, and the minimum SNR in the SEUP step, $SNR_{MIN}$, was 0.085. Also, $p(H_1)/p(H_0)$ was set to 0.0625, which may be varied according to the advance information about the presence/absence of speech.

The SNR correction parameter, $\alpha$, was 0.99, the parameter, $\zeta_n$, which is used in updating the noise power, was 0.99, and the parameter, $\zeta_s$, which is used in updating the predicted SNR, was 0.98. Also, the number of initial frames whose parameters are initialized for background noise information, MF, was 10.

The speech quality was evaluated by a mean opinion score (MOS) test which is a common subjective test in use. In the MOS test, the quality of speech was evaluated a scale having five levels, excellent, good, fair, poor and bad, by listeners. These five levels were assigned the numbers 5, 4, 3, 2 and 1, respectively, and the mean of scores given by 10 listeners for each data sample was calculated. For speech data samples for test, five sentences pronounced by respective male and female speakers were prepared, and the SNR of each of the 10 sentences was varied using three types of noise, white, buccaneer (engine) and bubble noise on the basis of the NOISEX-92 database. IS-127 standard signals, speech signals processed by the SEUP according to the present invention, and original noisy signals were presented to the trained 10 listeners and the quality of each sample was evaluated on the scale of one to five. After scoring level-5 of speech quality, means values were calculated for each sample. As a result of the MOS test, 100 data were collected for each SNR level of each noise. The speech samples were presented to the 10 listeners without identification of each sample so as to prevent listeners from having perceived ideas relating to a particular sample, and a clean speech signal as a reference signal was presented just before providing each sample signal to be tested, for consistency in using the 5 scales. The result of the MOS test is shown in Table 1.

TABLE 1

| | Type of noise | | | | | | | | | | | |
|---|---|---|---|---|---|---|---|---|---|---|---|---|
| | Buccaner | | | | White SNR | | | | Babble | | | |
| | 5 | 10 | 15 | 20 | 5 | 10 | 15 | 20 | 5 | 10 | 15 | 20 |
| None* | 1.40 | 1.99 | 2.55 | 3.02 | 1.29 | 2.06 | 2.47 | 3.03 | 2.44 | 3.02 | 3.23 | 3.50 |
| IS-127 | 1.91 | 2.94 | 3.59 | 4.19 | 2.13 | 3.12 | 3.55 | 4.13 | 2.45 | 3.14 | 3.82 | 4.49 |
| Present invention | 2.16 | 3.12 | 3.62 | 4.21 | 2.43 | 3.22 | 3.62 | 4.24 | 2.90 | 3.45 | 3.89 | 4.52 |

*"None" indicates the original noise signals to which any process has not been provided.

As shown in Table 1, the speech quality is relatively better in the samples to which the SEUP has been performed, according to the present invention, than in IS-127 standard samples. In particular, the lower the SNR, the greater the effect of the SEUP according to the present invention. In addition, for the case of having babble noise, which is prevalent in a mobile telecommunications environment, the effect of the SEUP according to the present invention is significant compared to the original noise signals.

As described above, the noise spectrum is estimated in speech presence intervals based on the speech absence probability, as well as in speech absence intervals, and the predicted SNR and gain are updated on a per-channel basis of each frame according to the noise spectrum estimate, which in turn improves the speech spectrum in various noise environments.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A speech enhancement method comprising the steps of:

(a) segmenting an input speech signal into a plurality of frames and transforming each frame signal into a signal of the frequency domain;

(b) computing the signal-to-noise ratio of a current frame, and computing signal-to-noise ratio of a frame immediately preceding the current frame;

(c) computing the predicted signal-to-noise ratio of the current frame which is predicted based on the preceding frame and computing the speech absence probability using the signal-to-noise ratio and predicted signal-to-noise ratio of the current frame;

(d) correcting the two signal-to-noise ratios obtained in the step (b) based on the speech absence probability computed in the step (c);

(e) computing the gain of the current frame with the two corrected signal-to-noise ratios obtained in the step (d), and multiplying the speech spectrum of the current frame by the computed gain;

(f) estimating the noise and speech power for the next frame to calculate the predicted signal-to-noise ratio for the next frame, and providing the predicted signal-to-noise ratio for the next frame as the predicted signal-to-noise ratio of the current frame for the step (c); and (g) transforming the result spectrum of the step (e) into a signal of the time domain.

2. The speech enhancement method of claim 1, between the steps (a) and (b), further comprising initializing the noise power estimate $\hat{\lambda}_{n,m}(i)$, the gain H(m,i) and the predicted signal-to-noise ratio $\xi_{pres}(m,i)$ of the current frame, for i channels of the first MF frames to collect background noise information, using the equation $$\hat{\lambda}_{n,m}(i) = \begin{cases} |G_m(i)|^2, & m = 0 \\ \varsigma_n \hat{\lambda}_{n,m-1}(i) + (1-\varsigma_n)|G_m(i)|^2, & 0 < m < MF \end{cases}$$

$$H(m, i) = GAIN_{MIN}$$

$$\xi_{pred}(m, i) =$$

-continued $$\begin{cases} \max[(GAIN_{MIN})^2, SNR_{MIN}], & m = 0 \\ \max\left[\varsigma_s \xi_{pred}(m-1, i) + (1-\varsigma_s)\dfrac{|\hat{S}_{m-1}(i)|^2}{\hat{\lambda}_{n,m-1}(i)}, SNR_{MIN}\right], & 0 < m < MF \end{cases}$$

where $\zeta_n$ and $\zeta_s$ are the initialization parameters, and $SNR_{MIN}$ and $GAIN_{MIN}$ are the minimum signal-to-noise ratio and the minimum gain, respectively, $G_m(i)$ is the i-th channel spectrum of the m-th frame, and $|\hat{S}_{m-1}(i)|^2$ is the speech power estimate for the (m−1)th frame.

3. The method of claim 2, wherein assuming that the signal-to-noise ratio of the current frame is $\xi_{post}(m,i)$, the signal-to-noise ratio of the current frame in the step (b) is computed using the equation $$\xi_{post}(m, i) = \max\left[\frac{E_{acc}(m, i)}{\hat{\lambda}_{n,m}(i)} - 1, SNR_{MIN}\right]$$

where $E_{acc}(m, i)$ is the power for the i-th channel of the m-th frame, obtained by smoothing the power of the m-th and (m−1)th frames, and $\hat{\lambda}_{n,m}(i)$ is the noise power estimate for the i-th channel of the m-th frame.

4. The method of claim 2, wherein assuming that the speech absence probability is $p(H_0|G_m(i))$ and each channel spectrum $G_m(i)$ of the m-th frame is independent, the speech absence probability in the step (b) is computed with the spectrum probability distribution in the absence of speech $p(G_m(i)|H_0)$ and the spectrum probability distribution in the presence of speech $p(G_m(i)|H_1)$, using the equation $$\begin{aligned} p(H_0 \mid G_m(i)) &= \frac{\prod_{i=0}^{N_c-1} p(G_m(i) \mid H_0)p(H_0)}{\prod_{i=0}^{N_c-1} p(G_m(i) \mid H_0)p(H_0) + \prod_{i=0}^{N_c-1} p(G_m(i) \mid H_1)p(H_1)} \\ &= \frac{1}{1 + \dfrac{p(H_1)}{p(H_0)} \prod_{i=0}^{N_c-1} \Lambda_m(i)(G_m(i))} \end{aligned}$$

where $N_c$ is the number of channels, and $$\Lambda_m(i)(G_m(i)) = \frac{1}{1+\xi_m(i)} \exp\left[\frac{(\eta_m(i)+1)\xi_m(i)}{1+\xi_m(i)}\right]$$

where $\eta_m(i)$ and $\xi_m(i)$ are the signal-to-noise ratio and the predicted signal-to-noise ratio for the i-th channel of the m-th frame, respectively.

5. The method of claim 4, wherein assuming that the signal-to-noise ratio of the current frame is $\xi_{post}(m,i)$ and the signal-to-noise ratio of the preceding frame is $\xi_{pri}(m,i)$, $\xi_{post}(m,i)$ and $\xi_{pri}(m,i)$ in the step (d) are corrected with the speech absence probability $p(H_0|G_m(i))$ and the speech-plus-noise presence probability $p(H_1|G_m(i))$, using the equation $$\xi_{pri}(m, i) = \max\{p(H_0 \,||\, G_m(i))SNR_{MIN} + p(H_1 \mid G_m(i))\xi_{pri}(m, i), SNR_{MIN}\}$$

$$\xi_{post}(m, i) = \max\{p(H_0 \,||\, G_m(i))SNR_{MIN} + p(H_1 \mid G_m(i))\xi_{post}(m, i), SNR_{MIN}\}$$

where $SNR_{MIN}$ is the minimum signal-to-noise ratio.

6. The method of claim 1, wherein the gain H(m,i) in the step (e) for an i-th channel of an m-th frame is computed with the signal-to-noise ratio of the preceding frame, $\xi_{pri}(m,i)$, and the signal-to-noise ratio of the current frame, $\xi_{post}(m,i)$, using the equation $$H(m,i) = \Gamma(1.5)\frac{\sqrt{V_m(i)}}{\gamma_m(i)}\exp\left(-\frac{V_m(i)}{2}\right)\left[(1+V_m(i))I_0\left(\frac{V_m(i)}{2}\right)+v_m(i)I_1\left(\frac{V_m(i)}{2}\right)\right]$$

where $$\gamma_m(i) = \xi_{post}(m,i)+1$$

$$V_m(i) = \frac{\xi_{pri}(m,i)}{1+\xi_{pri}(m,i)}(1+\xi_{post}(m,i))$$

and $I_0$ and $I_1$ are the 0th order and 1st order coefficients, respectively, of the Bessel function.

7. The method of claim 6, wherein the step (f) comprises:

estimating the noise power for the (m+1)th frame by smoothing the noise power estimate and the noise power expectation for the m-th frame;

estimating the speech power for the (m+1)th frame by smoothing the speech power estimate and the speech power expectation for the m-th frame; and computing the predicted signal-to-noise ratio for the (m+1)th frame using the obtained noise power estimate and speech power estimate.

8. The method of claim 7, wherein assuming that the noise power expectation of a given channel spectrum $G_m(i)$ for the i-th channel of the m-th frame is $E[|N_m(i)|^2|G_m(i)]$, the noise power expectation is computed using the equation $$E[|N_m(i)|^2 \mid G_m(i)] = E[|N_m(i)|^2 \mid G_m(i), H_0]p(H_0 \mid G_m(i)) + E[|N_m(i)|^2|G_m(i), H_1]p(H_1|G_m(i))$$

where $$E[|N_m(i)|^2 \mid G_m(i), H_0] = |G_m(i)|^2$$

$$E[|N_m(i)|^2 \mid G_m(i), H_1] = \left(\frac{\xi_{pred}(m,i)}{1+\xi_{pred}(m,i)}\right)\hat{\lambda}_{n,m}(i) + \left(\frac{1}{1+\xi_{pred}(m,i)}\right)^2|G_m(i)|^2$$

where $E[|N_m(i)|^2|(G_m(i), H_0]$ is the noise power expectation in the absence of speech, $E[|N_m(i)|^2|G_m(i), H_1]$ is the noise power expectation in the presence of speech, $\hat{\lambda}_{n,m}(i)$ is the noise power estimate, and $\xi_{pred}(m,i)$ is the predicted signal-to-noise ratio, each of which are for the i-th channel of the m-th frame.

9. The method of claim 7, wherein assuming that the speech power expectation of a given channel spectrum $G_m(i)$ for the i-th channel of the m-th frame is $E[|S_m(i)|^2|G_m(i)]$, the speech power expectation is computed using the equation $$E[|S_m(i)|^2 \mid G_m(i)] = E[|S_m(i)|^2 \mid G_m(i), H_1]p(H_1 \mid G_m(i)) + E[|S_m(i)|^2|G_m(i), H_0]p(H_0|G_m(i))$$

where $$E[|S_m(i)|^2 \mid G_m(i), H_1] = \left(\frac{1}{1+\xi_{pred}(m,i)}\right)\hat{\lambda}_{s,m}(i) + \left(\frac{\xi_{pred}(m,i)}{1+\xi_{pred}(m,i)}\right)^2|G_m(i)|^2$$

$$E[|S_m(i)|^2 \mid G_m(i), H_0] = 0$$

where $E[|S_m(i)|^2|G_m(i), H_0]$ is the speech power expectation in the absence of speech, $E[|S_m(i)|^2|G_m(i), H_1]$ is the speech power expectation in the presence of speech, $\hat{\lambda}_{s,m}(i)$ is the speech power estimate, and $\xi_{pred}(m,i)$ is the predicted signal-to-noise ratio, each of which are for the i-th channel of the m-th frame.

10. The method of claim 7, wherein assuming that the predicted signal-to-noise ratio for the (m+1)th frame is $\xi_{pred}(m+1,i)$, the predicted signal-to-noise ratio for the (m+1)th frame is calculated using the equation $$\xi_{pred}(m+1,i) = \frac{\hat{\lambda}_{s,m+1}(i)}{\hat{\lambda}_{n,m+1}(i)}$$

where $\hat{\lambda}_{n,m+1}(i)$ is the noise power estimate and $\hat{\lambda}_{s,m+1}(i)$ is the speech power estimate, each of which are for the i-th channel of the m-th frame.

* * * * *